US012638991B2

(12) United States Patent
Adsure et al.

(10) Patent No.: US 12,638,991 B2
(45) Date of Patent: May 26, 2026

(54) AVAILABLE MEMORY OPTIMIZATION TO MANAGE MULTIPLE MEMORY CHANNELS

(71) Applicant: Intel Corporation, Santa Clara, CA (US)

(72) Inventors: Virendra Vikramsinh Adsure, Folsom, CA (US); Deepak Gandiga Shivakumar, Beaverton, OR (US); Robert Royer, Jr., Portland, OR (US)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 17/673,162

(22) Filed: Feb. 16, 2022

(65) Prior Publication Data

US 2022/0171551 A1     Jun. 2, 2022

(51) Int. Cl.
*G06F 12/08* (2016.01)
*G06F 3/06* (2006.01)
*G06F 12/0808* (2016.01)
*G06F 12/0815* (2016.01)

(52) U.S. Cl.
CPC .......... *G06F 3/0634* (2013.01); *G06F 3/0625* (2013.01); *G06F 3/0632* (2013.01); *G06F 3/0659* (2013.01); *G06F 3/0679* (2013.01)

(58) Field of Classification Search
CPC .... G06F 3/0625; G06F 3/0632; G06F 3/0634; G06F 3/0659; G06F 3/0679

USPC ......................................................... 711/154
See application file for complete search history.

(56) References Cited

U.S. PATENT DOCUMENTS

| | | |
|---|---|---|
| 8,484,418 B2 | 7/2013 | Chishti et al. |
| 10,303,241 B2 | 5/2019 | Li et al. |
| 11,922,172 B2 | 3/2024 | Kotary et al. |
| 12,248,356 B2 | 3/2025 | Adsure et al. |
| 2009/0031078 A1* | 1/2009 | Warnes ................... G11C 29/42 |
| | | 711/E12.083 |
| 2014/0067139 A1* | 3/2014 | Berke ........................ G06F 1/26 |
| | | 700/291 |
| 2018/0293011 A1* | 10/2018 | Schluessler ........... G06F 1/3225 |
| 2022/0171551 A1* | 6/2022 | Adsure ................. G06F 3/0679 |
| 2022/0238159 A1* | 7/2022 | Bronner ................. G11C 16/26 |

\* cited by examiner

*Primary Examiner* — Mohamed M Gebril
(74) *Attorney, Agent, or Firm* — Compass IP Law PC

(57) ABSTRACT

Systems, apparatuses, and methods may provide for optimizing the available memory in a power conscious compute platform. For example, a semiconductor apparatus includes logic to communicate with a system memory to divide a plurality of memory channels into functional channels and performance channels. The functional channels are in an active power state during a boot process and the performance channels are in an idle power state during the boot process. The semiconductor apparatus includes logic to track memory usage and bring the performance channels out of the idle power state and into the active power state in response to the tracked memory usage.

16 Claims, 8 Drawing Sheets

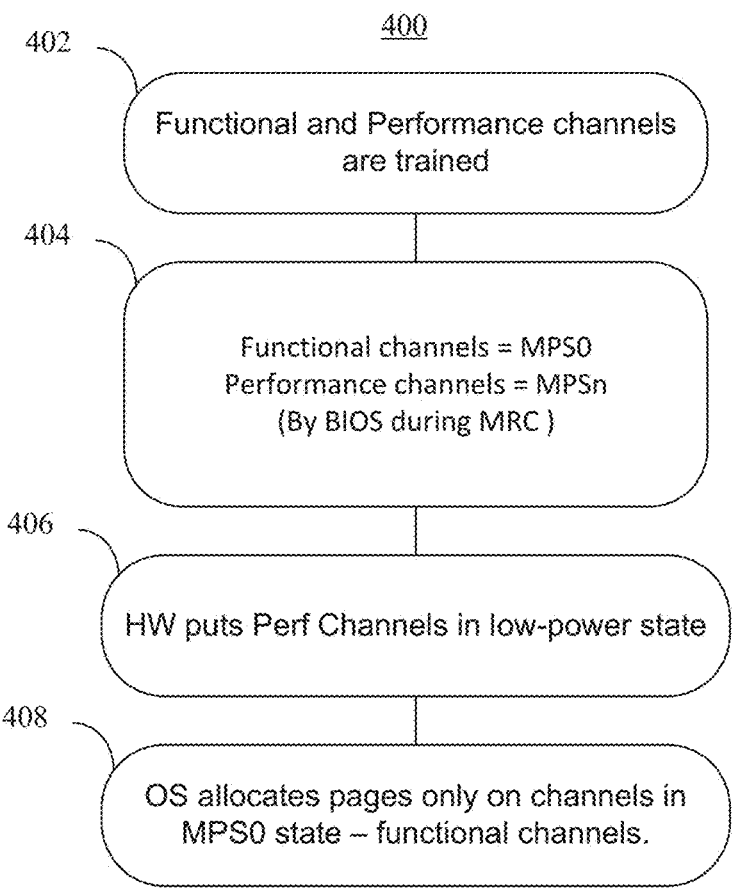

400

402 Functional and Performance channels are trained

404 Functional channels = MPS0
Performance channels = MPSn
(By BIOS during MRC )

406 HW puts Perf Channels in low-power state

408 OS allocates pages only on channels in MPS0 state – functional channels.

FIG. 4A

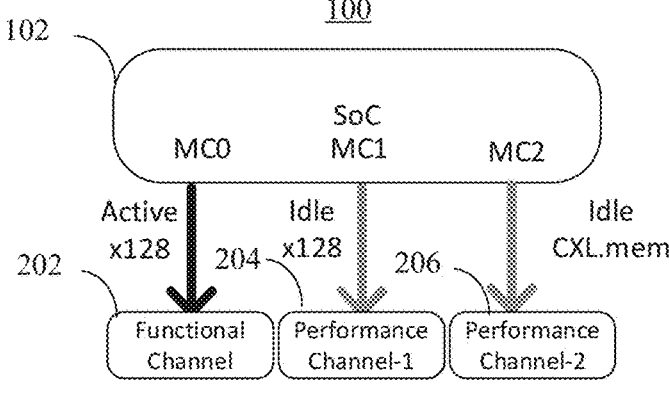

100

102 SoC
MC0      MC1      MC2

Active        Idle                Idle
x128          x128              CXL.mem
202    204        206

Functional    Performance    Performance
Channel       Channel-1      Channel-2

Functional Channels
Available to OS

FIG. 4B

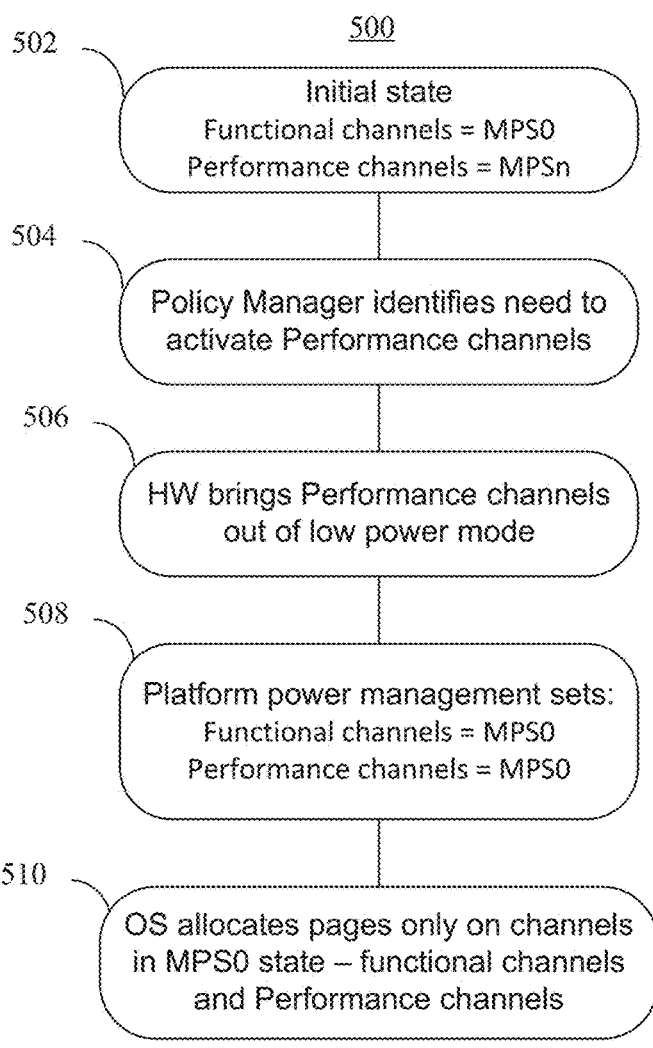

500

502 — Initial state
Functional channels = MPS0
Performance channels = MPSn

504 — Policy Manager identifies need to activate Performance channels

506 — HW brings Performance channels out of low power mode

508 — Platform power management sets:
Functional channels = MPS0
Performance channels = MPS0

510 — OS allocates pages only on channels in MPS0 state – functional channels and Performance channels

FIG. 5A

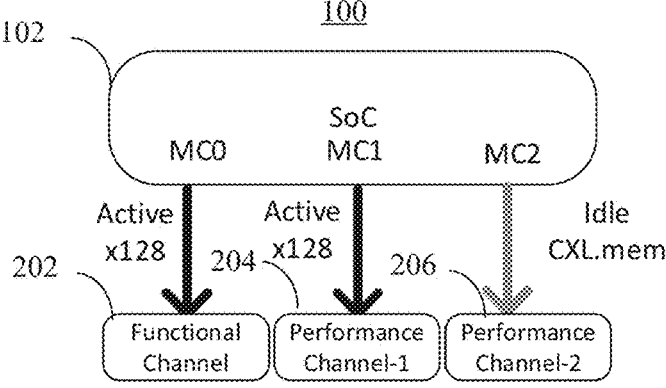

100

102

SoC
MC0     MC1     MC2

Active x128    Active x128    Idle CXL.mem 202    204    206

Functional Channel    Performance Channel-1    Performance Channel-2

Functional Channels and one Active
Performance Channel Available to OS

FIG. 5B

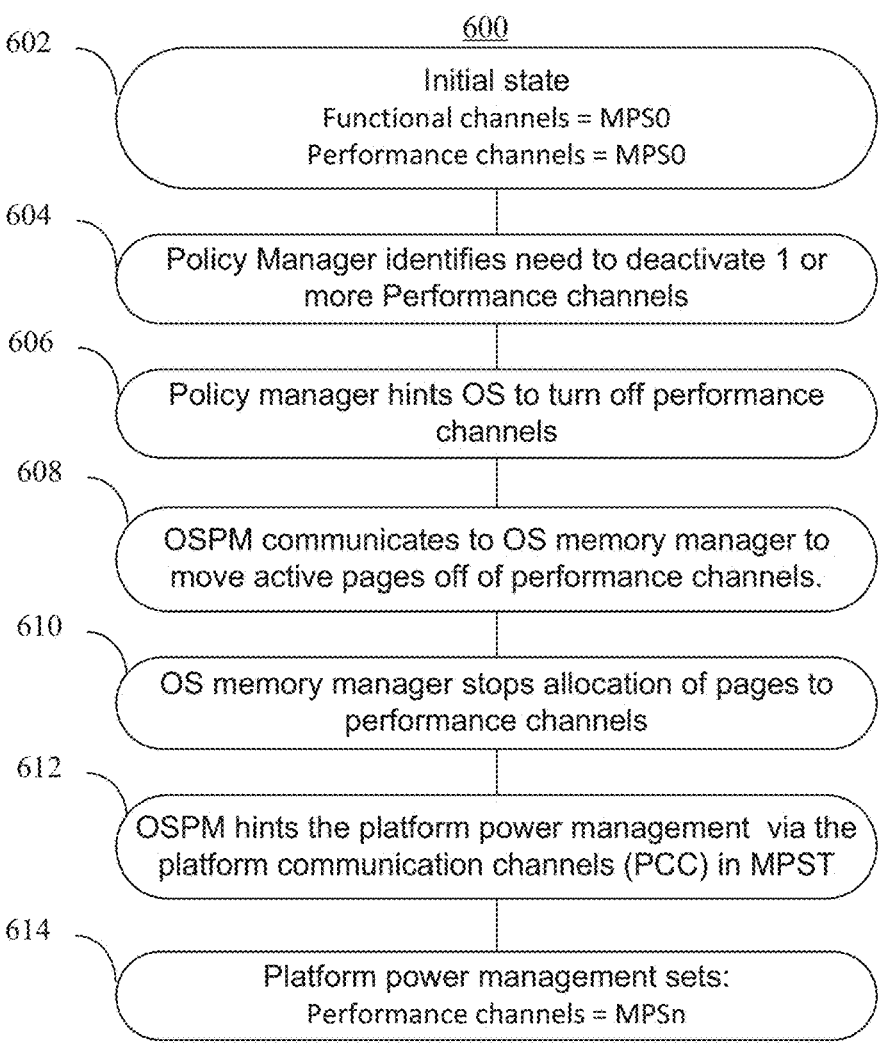

602 — 600

Initial state
Functional channels = MPS0
Performance channels = MPS0

604 — Policy Manager identifies need to deactivate 1 or more Performance channels 606 — Policy manager hints OS to turn off performance channels 608 — OSPM communicates to OS memory manager to move active pages off of performance channels.

610 — OS memory manager stops allocation of pages to performance channels

612 — OSPM hints the platform power management via the platform communication channels (PCC) in MPST 614 — Platform power management sets:
Performance channels = MPSn

FIG. 6A

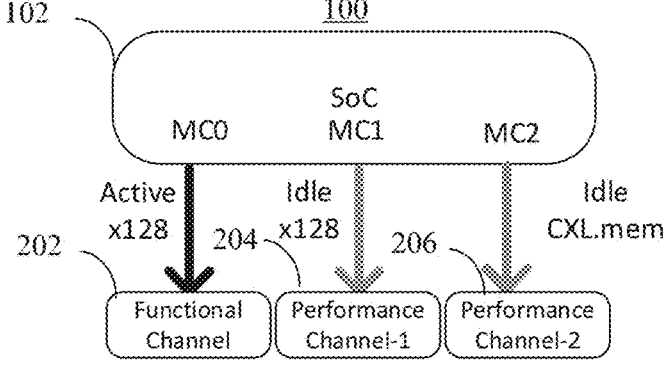

102 — 100

SoC
MC0        MC1        MC2

Active    Idle                Idle
x128      x128                CXL.mem 202        204        206

Functional Channel    Performance Channel-1    Performance Channel-2

Functional Channels
Available to OS

FIG. 6B

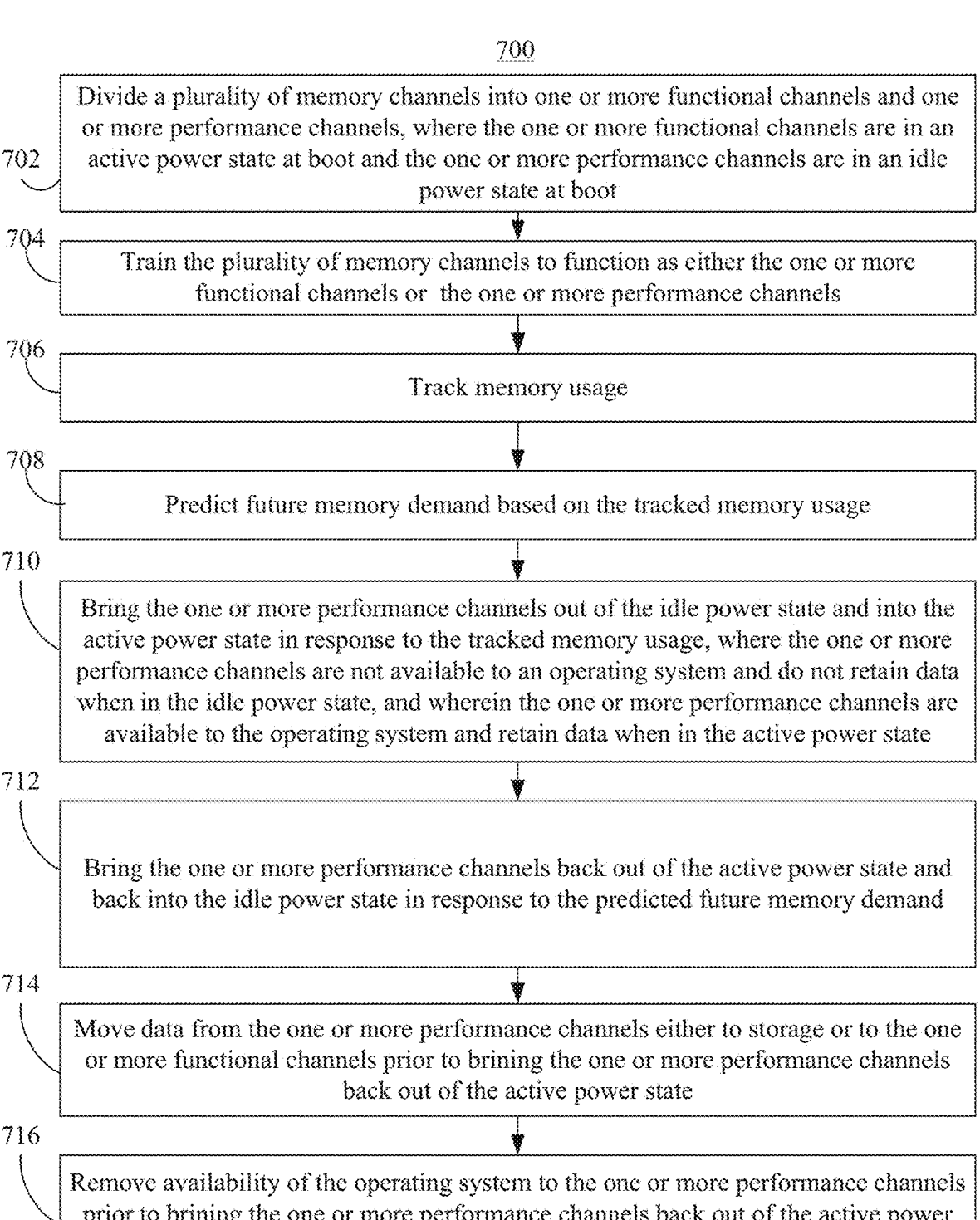

700

702   Divide a plurality of memory channels into one or more functional channels and one or more performance channels, where the one or more functional channels are in an active power state at boot and the one or more performance channels are in an idle power state at boot 704   Train the plurality of memory channels to function as either the one or more functional channels or the one or more performance channels 706   Track memory usage 708   Predict future memory demand based on the tracked memory usage 710   Bring the one or more performance channels out of the idle power state and into the active power state in response to the tracked memory usage, where the one or more performance channels are not available to an operating system and do not retain data when in the idle power state, and wherein the one or more performance channels are available to the operating system and retain data when in the active power state 712   Bring the one or more performance channels back out of the active power state and back into the idle power state in response to the predicted future memory demand 714   Move data from the one or more performance channels either to storage or to the one or more functional channels prior to brining the one or more performance channels back out of the active power state 716   Remove availability of the operating system to the one or more performance channels prior to brining the one or more performance channels back out of the active power state

AVAILABLE MEMORY OPTIMIZATION TO MANAGE MULTIPLE MEMORY CHANNELS

TECHNICAL FIELD

Embodiments generally relate to memory management. More particularly, embodiments relate to memory management of multiple types of memory channels.

BACKGROUND

The main vectors of memory that impact system power and performance typically are bandwidth, capacity, and power. Increased bandwidth typically helps the central processing unit (CPU) to simultaneously access more data while increased capacity typically allows for large amount of data available at a chronologically shorter distance from the CPU. Both help applications on a computing device to run faster and smoother.

However, not all applications running on a computing device typically need very high bandwidth or large capacity. For instance, most of the day-to-day applications like browsing, productivity and office applications only need a modest amount of bandwidth and capacity. Conversely, applications like video games, video, photo editing, scientific computation, and engineering applications typically need a large amount of bandwidth and capacity.

The telemetry data available from personal computing devices tends to show that for most of the time the computing devices are used for applications that require relatively low bandwidth and capacity, which renders the installed memory on the computing devices as over-provisioned. Such operations also consume a lot of power in the computing device and reduces the battery life of the computing device.

BRIEF DESCRIPTION OF THE DRAWINGS

The various advantages of the embodiments will become apparent to one skilled in the art by reading the following specification and appended claims, and by referencing the following drawings, in which:

FIG. 4A is a flowchart of another example of a method of operating the memory management system according to an embodiment;

FIG. 4B is an illustration of an example of the memory management system in operation according to an embodiment;

FIG. 5A is a flowchart of a further example of a method of operating the memory management system according to an embodiment;

FIG. 5B is an illustration of another example of the memory management system in operation according to an embodiment;

FIG. 6A is a flowchart of a still further example of a method of operating the memory management system according to an embodiment;

FIG. 6B is an illustration of yet another example of the memory management system in operation according to an embodiment;

FIG. 7 is a flowchart of yet another example of a method of operating the memory management system according to an embodiment;

DESCRIPTION OF EMBODIMENTS

Figure 1:
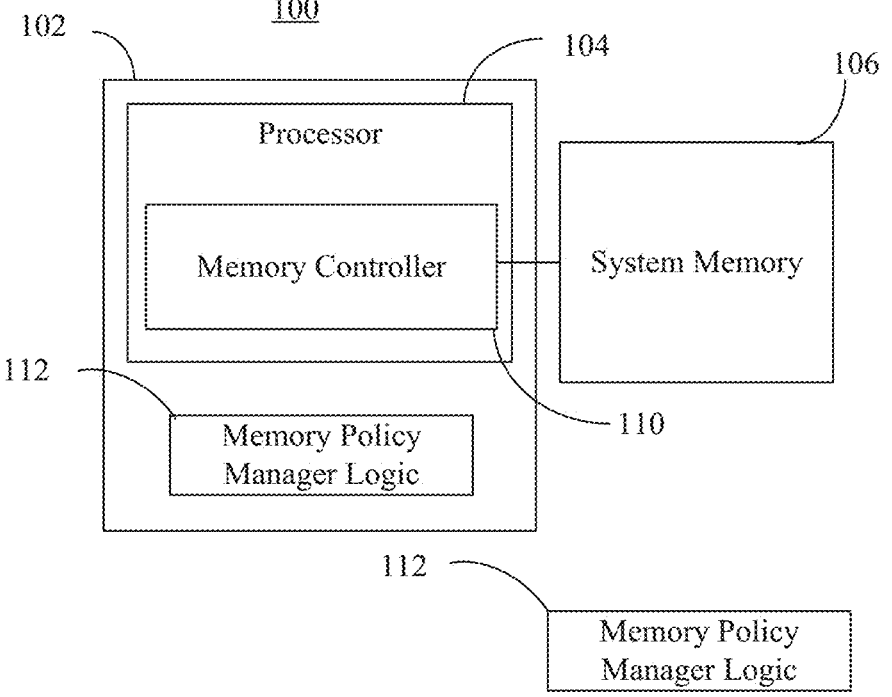
FIG. 1 is a block diagram of an example of a memory management system according to an embodiment.

Due to availability of advanced silicon processes and shrinking size of transistors, it has become possible to cram more transistors per mm of space on the silicon. Dynamic random access memory (DRAM) manufacturers are likely to increase the DRAM die density and therefore the available capacity of the DRAMs. For example, the systems which were limited to 64 GB of memory with 8 Gb DRAMs will likely see up to 256 GB with 32 Gb DRAM density in a few years. Some systems will also see an increase in the number of available memory channels from 2 to 4 and more, increasing the capacity to 512 GB and higher. Additionally, some systems will also see multiple tiers of memory. With cheaper 'bulk' memory on buses like CXL or other augmenting the DDR memory to increase the system memory capacity.

Also, a more granular control over the memory channels, as the width of memory channels is reduced, and the number of memory channels is increased, may be feasible. For example, in current client laptops, DDR4 (e.g., Double Data Rate (DDR) SDRAM) based systems have 2 channels of 64 bits, while DDR5 has 4 channels of 32 bits and DDR6 is expected to have 8 channels of 16 bits.

The increase in number of memory channels may provide more memory bandwidth and capacity to the system and improving the performance of the systems for applications demanding high bandwidth and capacity and unleash new use cases. Problematically, such a situation will also dramatically increase the power drawn by the memory subsystem and reduce the battery life of the system.

Reducing the installed memory may seem like an obvious answer to this problem. However, reducing the installed memory would then result in degraded performance in certain segment of the computing device when applications like games, video/photo editing, etc. are run.

As will be described in greater detail below, implementations described herein may provide for optimizing available memory in a power conscious compute platform. For example, a memory policy manager includes logic to communicate with a system memory to divide a plurality of memory channels into functional channels and performance channels. The functional channels are in an active power state during a boot process and the performance channels are in an idle power state during the boot process. The memory policy manager includes logic to track memory usage and bring the performance channels out of the idle power state and into the active power state in response to the tracked memory usage.

The current method used by all the Von Neumann architecture machines is to enable all the installed memory when the system powers-on and keep it available to the Operating System (OS) even when there is little or no memory pressure. Conversely, as will be described in greater detail below, performance channels may be utilized, which are not actively used by the OS on power-up and do not retain data.

In some implementations described wherein, a framework is utilized that monitors a user's real-time memory usage and makes decision for memory bandwidth and capacity requirement for that user. In response, the number of memory channels that would be visible to the OS is controlled based on the real-time memory usage.

For example, a computing system may be utilized that has multiple memory channels and/or multiple levels or tiers of memory. The memory channels or tiers are divided into two categories (e.g., functional channels and performance channels). When the system powers on all memory channels are trained and are ready to function normally. As part of the boot flow only the functional channels are made available to the OS and the performance channels are held in a very low power state (e.g., a deep sleep low power state in DDR5). At this point the performance channels are not actively used by the OS and do not retain data. A memory policy manager continuously tracks the user's system usage. When certain conditions are met, the memory policy manager decides to bring one or more of the performance channels out of low power state and makes these performance channels available to the OS. In the reverse, upon the lapse of the memory pressure and when certain conditions are met the policy manager may decide to disable the performance channels. In such a situation the data from the performance channels may be moved either to storage or to the functional channels by either the OS or a hardware accelerator. The performance channels are then made unavailable to the OS. A power control unit can then put the performance channels and associated memory and controllers back into low power state. In some examples, the policy manager could be implemented via logic instructions (e.g., middleware), configurable logic, fixed-functionality hardware logic, etc., or any combination thereof.

Implementations described herein advantageously provide power savings. For example, typical systems—even the high-end systems—are often used for browsing and communication. These browsing and communication applications use relatively low memory bandwidth in the range of 10-30 GB/s. This bandwidth can easily be supplied by a 128-bit memory channel. Also, with increasing DRAM bit density the memory capacity for one channel is sufficient for running these workloads. In a system with a 256-bit memory channel, turning off 128-bits will reduce the power in the memory controller, physical layer (PHY), and DRAMs, etc. Additionally, or alternatively, implementations described herein advantageously provide scalability. For example, some implementations are extended to include tiered memory including CXL.mem (e.g., COMPUTE EXPRESS LINK (CXL)) or similar based memory channels.

FIG. 1 is a block diagram of an example of a memory management system 100 according to an embodiment. As illustrated, the memory management system 100 includes a system on chip (SoC) 102 including a processor 104. The memory management system 100 includes a memory controller 110 in communication with a system memory 106.

Additionally, the memory management system 100 includes a memory policy manager logic 112. In some implementations, the memory policy manager logic 112 is implementable via the memory controller 110, via the system on chip (SoC) 102 itself, as software (e.g., as configurable logic, fixed-functionality hardware logic, the like, and/or any combination thereof). For example, the memory policy manager logic 112 is to communicate with system memory 106 to divide a plurality of memory channels into functional channels and performance channels. The functional channels are in an active power state during a boot process and the performance channels are in an idle power state during the boot process. The memory policy manager logic 112 is to track memory usage and bring the performance channels out of the idle power state and into the active power state in response to the tracked memory usage. As illustrated, the memory policy manager logic 112.

In some implementations, the processor 104 may be a central processing unit (CPU) that includes the memory policy manager logic 112 as an integrated memory controller (WIC). For example, the memory policy manager logic 112 may be integrated inside a central processing unit (CPU) socket but be distinct from cores of the central processing unit (CPU). In such an example, the processor 104 and the memory policy manager logic 112 may be integrated onto a shared semiconductor die in a system on chip (SoC) architecture.

In some implementations, the memory policy manager logic 112 communicates with the system memory 106. In such implementations, the memory policy manager logic 112 is to optimize the available memory in a power conscious compute platform. For example, the memory policy manager logic 112 is to communicate with system memory 106 to divide a plurality of memory channels into functional channels and performance channels. The functional channels are in an active power state during a boot process and the performance channels are in an idle power state during the boot process. The memory policy manager logic 112 is to track memory usage and bring the performance channels out of the idle power state and into the active power state in response to the tracked memory usage.

In some implementations, a combination of a power control unit (not illustrated) and the memory controller 110 are used to implement and/or facilitate the operation of the memory policy manager logic 112. In such an example, the power control unit bay involved as the memory controller 110 itself can also be placed in a low power state.

The system memory 106 may be part of a memory device that includes non-volatile memory and/or volatile memory. Non-volatile memory is a storage medium that does not require power to maintain the state of data stored by the medium. In one embodiment, the memory structure is a block addressable storage device, such as those based on NAND or NOR technologies. A storage device may also include future generation nonvolatile devices, such as a three-dimensional (3D) crosspoint memory device, or other byte addressable write-in-place nonvolatile memory devices. In one embodiment, the storage device may be or may include memory devices that use silicon-oxide-nitride-oxide-silicon (SONOS) memory, electrically erasable programmable read-only memory (EEPROM), chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The term "storage device" may refer to the die itself and/or to a packaged memory product. In some embodiments, 3D crosspoint memory may comprise a transistor-less stackable cross point architecture in which memory cells sit at the intersection of word lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD235, JESD218, JESD219, JESD220-1, JESD223B, JESD223-1, or other suitable standard (the JEDEC standards cited herein are available at jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at jedec.org). Such standards (and similar standards) may be referred to as DDR-based standards and communication interfaces of the storage devices that implement such standards may be referred to as DDR-based interfaces.

Figure 2:
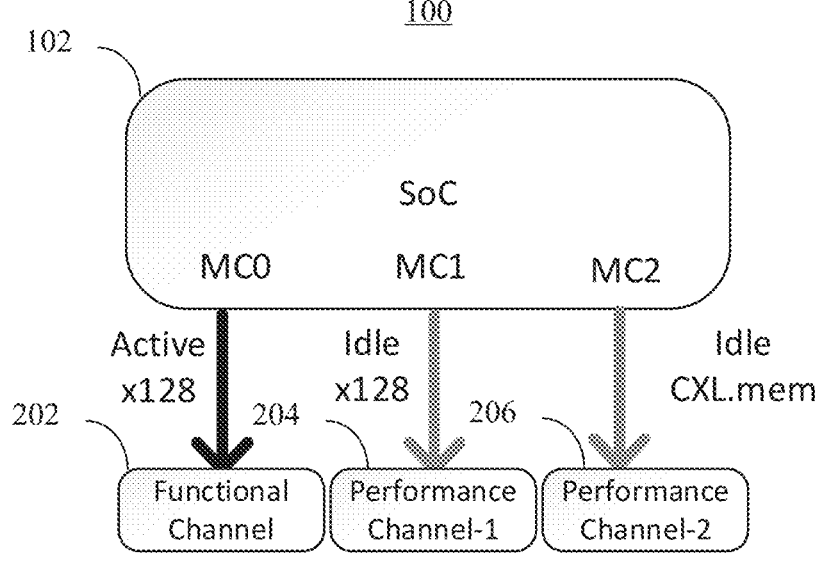
FIG. 2 is an illustration of another example of the memory management system according to an embodiment.

FIG. 2 is a block diagram of another example of the memory management system 100 according to an embodiment. As illustrated, the memory management system 100 includes the system on chip (SoC) 102. The memory management system 100 includes a memory policy manager logic in communication with a system memory via a first memory channel MC0, a second memory channel MC1, and up to an Nth memory channel MC2.

An example system that has 4 64-bit channels of DDR memory and 1 channel of CXL.mem based memory is illustrated. The system memory policy-manager can classify these channels as functional channels or performance channels.

As used herein, the term "functional channels" refers to the memory ranges backed by these channels as being expected to be always available to the OS. In the above example, 2 64-bit channels are functional channels.

As used herein, the term "performance channels" refers to the memory ranges backed by these channels as being grouped under an 'Memory Power Node Id' (MPN id) with a range of power states. For example, at boot, these performance channels start with the deepest low power state say MPSx (1<x<N). When the policy manager identifies application launches with high memory demand or when the policy manager encounters high memory pressure, one or more performance channels can be brought to active memory power state for use. In the example above 2 of the 4 64-bit DDR channels and the CXL.mem channel could be the performance channels. It is possible to further subdivide these as 2 64-bit DDR as performance group-1 and the CXL.mem as performance group-2 channels. The performance channels grouping could also be based on bandwidth and capacity. For example, the 2 64-bit DDR channels could be performance channels for additional bandwidth while the CXL.mem channels could be for additional capacity.

In the illustrated implementation, the first memory channel MC0 is configured as a functional channel 202 that is active, the second memory channel MC1 is configured as a performance channel 204 that is inactive, and the Nth memory channel MC2 is configured as a performance channel 206 that is inactive.

In operation, the policy manager is to predict the memory pressure, quality of service (QoS) requirements, and application behavior, etc. to influence the total memory available to the Operating System (OS). For example, the policy manager is to collect telemetry data that describes current memory utilization and an amount of free memory available within the OS and then comparing these to incoming demand periodically. Tracking paging activity may be performed as prolonged spikes may indicate memory pressure, for example. Using telemetry may identify specific applications requiring large memory footprint, high throughput, and/or low latency, and sensitivity to paging activity.

In some implementations, the policy manager balances memory channels in the active power state to provide an optimal number of channels to the OS during runtime. The decision to make additional memory channels available to the OS (or remove some of the channels from circulation) can be based on several factors.

In examples where requirements are invoked by applications, certain modern applications that need high bandwidth (e.g., applications like media editing or gaming could be tagged as high-bandwidth demand applications). In some implementations, when these applications are invoked, the OS can communicate the need for higher bandwidth to a power control unit, which would in-turn communicate with the memory controller to bring the required number of channels out of low power state.

In examples where there is a reactive change by the power control unit, currently the power control unit changes the dynamic frequency operating point of the memory when the bandwidth pressure increases. In some implementations, this concept can be extended in some implementations herein to make more of the memory channels available to the OS as the memory pressure increases.

In examples regarding power settings of the computing device, modern personal computers (PCs) typically have power control settings that optimize the PC for performance when connected to AC power and for power saving when operating on battery power. In some implementations, the number of memory channels can also be associated with these power schemes wherein the number of channels will be less in the battery mode operation and increase when the system is plugged in AC power Additionally, or alternatively, other factors may be considered in some implementations, such as: memory power nodes having low utilization, memory channels that are idle for a given period of time consuming idle power, the OS transitioning to a low power state and one or more power channels have low memory utilization, communication with the OS and the platform power control unit (e.g., via an Advanced Configuration and Power Interface (ACPI) mechanism, the like, and/or combinations thereof.

Referring to Table 1 below, a Memory Power State Table (MPST) in the Advanced Configuration and Power Interface (ACPI) defines memory ranges associated with memory power states that hardware and software can co-manage. The memory power states start with an active state (MPS0) and power managed states (MPS1 . . . MPSN, where 1 . . . N defines a range of power states with ascending power savings) for a given memory range. While MPS0 is an active power state, where hardware may transparently manage memory power state of the associated memory range. All available memory channels in the system like the DDR based memory, CXL.mem, or other memory types are assigned a 'Memory Power Node Id' (MPN id) in the MPST.

TABLE 1

| MPN ID | Memory Range | MPN Type | MPS | MPS at boot |
|--------|--------------|----------|-----|-------------|
| 0 | 0 to 16 GB | Functional | 0 (always on) | MPS0 |
| 1 | 16 GB to 64 GB | Performance | 0, 1, 2. . . N | MPSN |
| 2 | 64 GB to 1 TB | Performance | 0, 1, 2. . . N | MPSN |

In some examples, the Operating System (OS) consumes MPST and tracks all memory ranges based on MPN identifiers as shown in Table 1. Based on the MPN identifier the OS treats both the functional and performance channels separately. The memory range/s that are part of the functional channel are tracked as separate range(s) that is always kept available to the OS, for example.

In some implementations, the OS tracks the memory ranges associated with the MPN identifier for the performance channels separately to enable better power management of these performance channels. To enable this concept, we envision the memory interleaving to happen at a sub-NUMA cluster.

For example, when each range is in MPS0, the OS can freely allow memory allocations to applications based on memory utilization and channel occupancy before tapping into another performance channel that is currently in low power state. When channel occupancy is low and memory demand is declining, the OS can gradually restrict new memory allocations to enable the corresponding channel to be put into a lower power state. The policy manager can track memory usages and trigger transitions based on pre-built policies. These policies may adapt to usage characteristics over time or explicitly enabled by users. These types of transitions allow for platform and telemetry-based memory power management more aggressively.

As illustrated, Table 1 depicts a simple example representation of memory channels that are exposed to the Operating System and their corresponding memory ranges with associated memory power state at boot (MPS at boot). The Operating System enumerates the memory that is under functional channels and puts them in circulation. The Operating System also enumerates available performance channels, the memory allocation from these performance channels is tied to their current MPS state, for example. If it is not MPS0, then no memory is allocated for these performance channels. Under memory pressure, OS power management may receive a request to change a specific performance channel's MPS state to MPS0. Alternately, an interface to an OS power management unit (OSPM) and the OS memory management may be exposed to the policy manager to trigger power state transition for a given performance channel.

Figure 3:
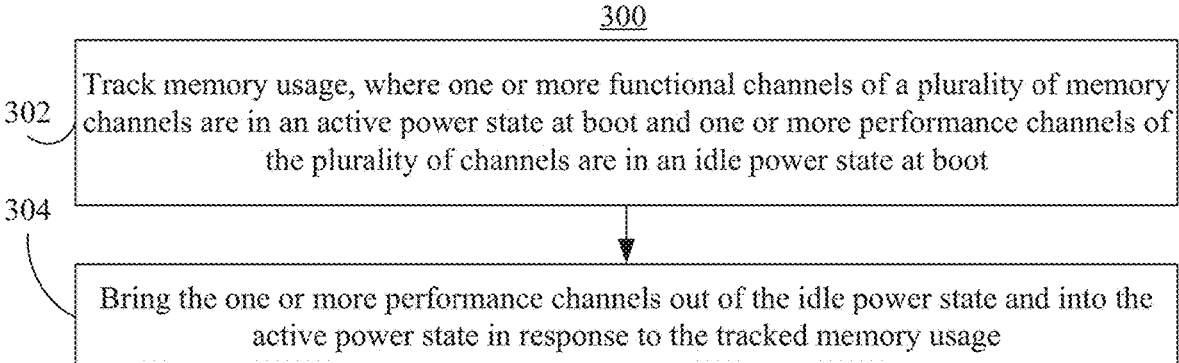
FIG. 3 is a flowchart of an example of a method of operating the memory management system according to an embodiment.

FIG. 3 shows a method 300 of operating a memory management system according to an embodiment. The method 300 may generally be implemented in a memory system, such as, for example, the method 300 may generally be implemented as the memory policy manager (e.g., see FIGS. 1 and 2), already discussed.

More particularly, the method 300 (as well as the method 400 (FIG. 4A), the method 500 (FIG. 5A), the method 600 (FIG. 6A), and/or the method 700 (FIG. 7)) may be implemented in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations may include configurable logic, fixed-functionality logic, or any combination thereof. Examples of configurable logic include suitably configured programmable logic arrays (PLAs), field programmable gate arrays (FPGAs), complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

For example, computer program code to carry out operations shown in the method 300 (as well as the method 400 (FIG. 4A), the method 500 (FIG. 5A), the method 600 (FIG. 6A), and/or the method 700 (FIG. 7)) may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 302 is to track memory usage. For example, the plurality of memory channels have been trained to function as either the one or more functional channels or as the one or more performance channels in response to powering on. In some implementations, the one or more functional channels are in an active power state during a boot process and the one or more performance channels are in an idle power state during the boot process.

Illustrated processing block 304 is to bring the one or more performance channels out of the idle power state and into the active power state in response to the tracked memory usage. In some implementations, the one or more performance channels are not available to an operating system and do not retain data when in the idle power state. Conversely, the one or more performance channels are available to the operating system and retain data when in active power state.

Additional and/or alternative operations for method 300 are described in greater detail below in the description of the method 400 (FIG. 4A), the method 500 (FIG. 5A), the method 600 (FIG. 6A), and/or the method 700 (FIG. 7).

FIG. 4A is a flowchart of another example of a method 400 of operating the memory management system according to an embodiment. The method 400 may generally be implemented in a memory management system, such as, for example, the method 400 may generally be implemented via the memory management system 100 (e.g., see FIGS. 1 and 2), already discussed.

As will be described in greater detail below, method 400 shows an enumeration process for platform firmware boot steps and memory setup steps.

Illustrated processing block 402 trains the functional channels and performance channels. For example, the memory reference code (MRC) or other similar firmware trains all the memory channels. The functional as well as the performance channels are trained.

Illustrated processing block 404 sets the power state of the functional channels and performance channels. For example, as part of the boot flow the BIOS marks the functional channels as MPS0 in the MPST. The performance channels are marked as MPSn in the MPST. Illustrated processing block 406 places the performance channels in an inactive power state. Illustrated processing block 408 allocates pages only on channels in an active power state.

In operation during an OS boot load, a memory map is consumed, and all available memory is enumerated. The MPST is consumed, and enumerated memory is bifurcated into memory channel lists based on memory power nodes described in the MPST. An MPN Type is identified as functional or performance and only memory channels that are in MPS0 are turned on for allocations. Then the OS boot is completed.

FIG. 4B is an illustration of an example of the memory management system 100 in operation in response to the method 400 according to an embodiment. In the illustrated implementation, the first memory channel MC0 is configured as the functional channel 202 that is active, the second memory channel MC1 is configured as the performance channel 204 that is inactive, and the Nth memory channel MC2 is configured as the performance channel 206 that is inactive.

FIG. 5A is a flowchart of a further example of a method 500 of operating the memory management system according to an embodiment. The method 500 may generally be implemented in a memory system, such as, for example, the method 500 may generally be implemented via the memory management system 100 (e.g., see FIGS. 1 and 2), already discussed.

As will be described in greater detail below, method 500 shows a process to enable usage of the performance channels.

Illustrated processing block 502 has an initial inactive state for the performance channels and an initial active state functional channels.

Illustrated processing block 504 identifies a need to activate one or more performance channels. For example, the policy manager identifies that application with high memory or throughput requirement, memory pressure, poor memory QoS, the like, and/or combinations thereof. In response, the policy manager triggers the transition of a memory channel to an active state based on the condition and channels performance characteristics.

Illustrated processing block 506 brings one or more performance channels out of the inactive power mode. For example, the power control hardware and memory controller bring the desired performance channels out of low power state.

Illustrated processing block 508 transitions the power state for the performance channels to an active power state. For example, the policy manager triggers the platform power management transition the required performance channel/s from MPS0 to MPSn state.

Illustrated processing block 510 allocates pages only on performance channels in an active power state and functional channels. For example, the policy manager also hints the OS power management unit (OSPM) of this transition (e.g., via a doorbell mechanism in the MPST). The OSPM then indicates to OS memory manager that the corresponding memory channel is available for use.

FIG. 5B is an illustration of another example of the memory management system 100 in response to the method 500 according to an embodiment. In the illustrated implementation, the first memory channel MC0 is configured as the functional channel 202 that is active, the second memory channel MC1 is configured as the performance channel 204 that has changed from inactive to being active, and the Nth memory channel MC2 is configured as the performance channel 206 that is inactive.

FIG. 6A is a flowchart of a still further example of a method 600 of operating the memory management system according to an embodiment. The method 600 may generally be implemented in a memory system, such as, for example, the method 600 may generally be implemented via the memory management system 100 (e.g., see FIGS. 1 and 2), already discussed.

As will be described in greater detail below, method 600 shows a process to disable the performance channels.

Illustrated processing block 602 has an initial active state for at least some of the performance channels and an initial active state functional channels.

Illustrated processing block 604 identifies a need to deactivate one or more of the previously activated performance channels. For example, the policy manager uses telemetry and heuristics to identify an opportunity for removing the performance channels from circulation.

Illustrated processing block 606 requests turning off one or more selected performance channels. For example, the policy manager triggers a request to OSPM to turn off a specific memory channel.

Illustrated processing block 608 moves active pages off of these selected performance channels. For example, the OSPM passes the request to the OS memory management to move active pages off the memory channel.

Illustrated processing block 610 stops allocation of pages to the selected performance channels. For example, the OSPM passes the request to the OS memory management to turn off memory allocation for the requested channel.

Illustrated processing block 612 provides hints to the platform power management. For example, the OSPM then leverages the platform communication channel (PCC) in MPST to invoke the platform power management (PPM) component that transitions the required performance channel from MPS0 to MPSn state.

Illustrated processing block 614 returns the selected performance channels to an inactive power state. For example, the PPM set the performance channels to MPS0, and the hardware puts the said performance channel into an inactive power state.

FIG. 6B is an illustration of yet another example of the memory management system 100 in response to the method 500 according to an embodiment. In the illustrated implementation, the first memory channel MC0 is configured as the functional channel 202 (FIG. 2) that is active, the second memory channel MC1 is configured as the performance channel 204 (FIG. 2) that has changed from being active back to being inactive, and the Nth memory channel MC2 is configured as the performance channel 206 (FIG. 2) that is inactive.

FIG. 7 is a flowchart of yet another example of a method 700 of operating the memory management system according to an embodiment. The method 700 may generally be implemented in a memory system, such as, for example, the method 700 may generally be implemented as the memory policy manager (e.g., see FIGS. 1 and 2), already discussed.

Illustrated processing block 702 divides a plurality of memory channels. For example, the plurality of memory channels are divided into one or more functional channels and one or more performance channels. In some implementations, the one or more functional channels are in an active power state during a boot process and the one or more performance channels are in an idle power state during the boot process.

Illustrated processing block 704 trains the plurality of memory channels. For example, the plurality of memory channels are trained to function as either the one or more functional channels or as the one or more performance channels in response to powering on. Illustrated processing block 706 tracks memory usage. Illustrated processing block 708 predicts future memory demand. For example, future memory demand is predicted based on the tracked memory usage.

Illustrated processing block 710 brings the one or more performance channels out of the idle power state and into the active power state in response to the tracked memory usage. In some implementations, the one or more performance channels are not available to an operating system and do not retain data when in the idle power state. Conversely, the one or more performance channels are available to the operating system and retain data when in the active power state.

Illustrated processing block 712 brings the one or more performance channels out of the idle power state and into the active power state in response to the predicted future memory. For example, the one or more performance channels are brought out of the idle power state and into the active power state in response to the predicted future memory demand in addition to or instead of being based on the tracked memory usage.

Illustrated processing block 714 move data from the one or more performance channels. For example, data from the one or more performance channels is moved either to storage or to the one or more functional channels prior to bringing the one or more performance channels back out of the active power state and back into the idle power state.

Illustrated processing block 716 remove availability of the operating system to the one or more performance channels. For example, availability of the operating system to the one or more performance channels is removed prior to bringing the one or more performance channels back out of the active power state and back into the idle power state. As discussed above, in some implementations the memory controller manages a system memory communicatively coupled to a processor.

Figure 8:
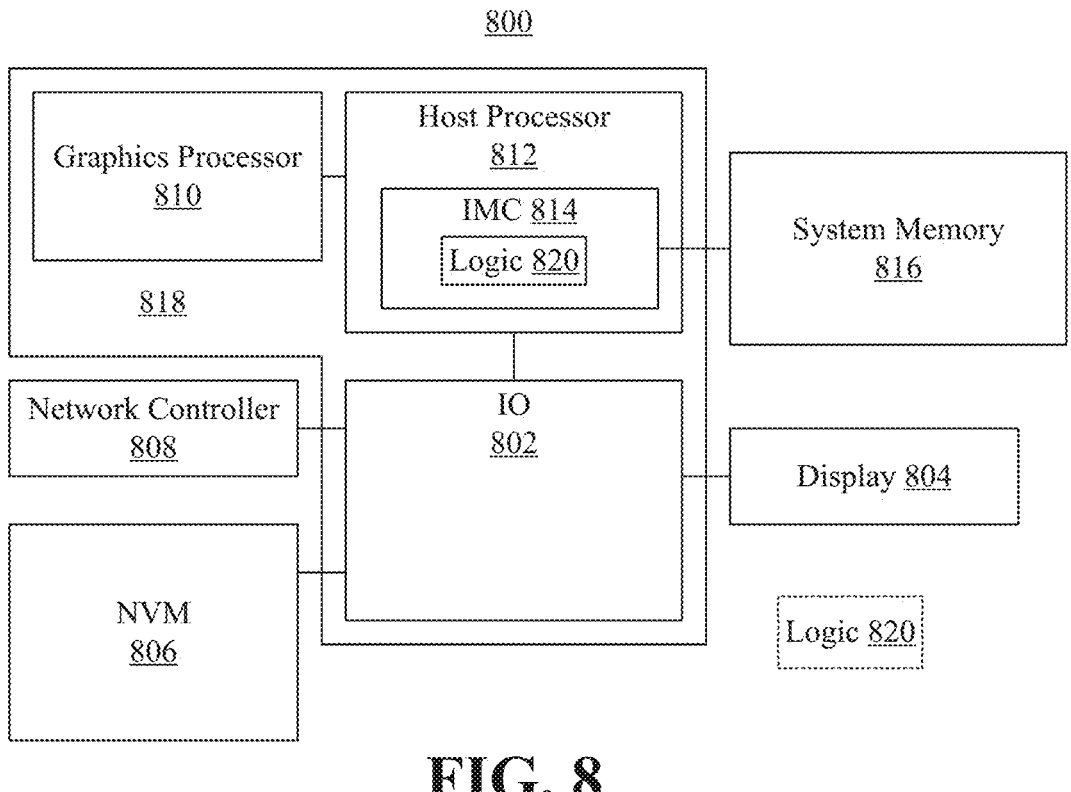
FIG. 8 is a block diagram of an example of a performance-enhanced computing system according to an embodiment.

FIG. 8 shows a performance-enhanced computing system 800. The system 800 may generally implement one or more aspects of the method 300 (FIG. 3), the method 400 (FIG. 4A), the method 500 (FIG. 5A), the method 600 (FIG. 6A), and the method 700 (FIG. 7), already discussed.

More particularly, the system 800 may be part of a server, desktop computer, notebook computer, tablet computer, convertible tablet, smart television (TV), personal digital assistant (PDA), mobile Internet device (MID), smart phone, wearable device, media player, vehicle, robot, etc., or any combination thereof. In the illustrated example, an input/output (10) module 802 is communicatively coupled to a display 804 (e.g., liquid crystal display/LCD, light emitting diode/LED display, touch screen), NVM 806 (non-volatile memory, e.g., NAND flash memory) and a network controller 808 (e.g., wired, wireless).

The system 800 may also include a graphics processor 810 and a host processor 812 (e.g., central processing unit/CPU) that includes an integrated memory controller (IMC) 814, wherein the illustrated IMC 814 communicates with a system memory 816 over a bus or other suitable communication interface. The host processor 812, the graphics processor 810 and the IO module 802 are integrated onto a shared semiconductor die 818 in a system on chip (SoC) architecture.

The integrated memory controller 814 includes logic 820 (e.g., a memory controller including logic instructions, configurable logic, fixed-functionality hardware logic, etc., or any combination thereof) to implement one or more aspects of the method 300 (FIG. 3), the method 400 (FIG. 4A), the method 500 (FIG. 5A), the method 600 (FIG. 6A), and the method 700 (FIG. 7), already discussed.

Thus, the logic 820 may communicate with a local system memory and with a memory controller optimize the available memory in a power conscious compute platform. For example, a memory controller includes logic to communicate with a system memory to divide a plurality of memory channels into functional channels and performance channels. The functional channels are in an active power state during a boot process and the performance channels are in an idle power state during the boot process. The memory controller includes logic to track memory usage and bring the performance channels out of the idle power state and into the active power state in response to the tracked memory usage.

The illustrated system 800 may be considered to be performance-enhanced at least to the extent that it may advantageously provide power savings. For example, typical systems—even the high-end systems—are often used for browsing and communication. These browsing and communication applications use relatively low memory bandwidth in the range of 10-30 GB/s. This bandwidth can easily be supplied by a 128-bit memory channel. Also, with increasing DRAM bit density the memory capacity for one channel is sufficient for running these workloads. In a system with a 256-bit memory channel, turning off 128-bits will reduce the power in the memory controller, physical layer (PHY), and DRAMs, etc. Additionally, or alternatively, implementations described herein advantageously provide scalability. For example, some implementations are extended to include tiered memory including CXL.mem (e.g., COMPUTE EXPRESS LINK (CXL)) or similar based memory channels.

In an embodiment, the system memory 816 is storage containing a memory structure that may include non-volatile memory and/or volatile memory. Non-volatile memory is a storage medium that does not require power to maintain the state of data stored by the medium. In one embodiment, the memory structure is a block addressable storage device, such as those based on NAND or NOR technologies. A storage device may also include future generation nonvolatile devices, such as a three-dimensional (3D) crosspoint memory device, or other byte addressable write-in-place nonvolatile memory devices. In one embodiment, the storage device may be or may include memory devices that use silicon-oxide-nitride-oxide-silicon (SONOS) memory, electrically erasable programmable read-only memory (EEPROM), chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The term "storage device" may refer to the die itself and/or to a packaged memory product. In some embodiments, 3D crosspoint memory may comprise a transistor-less stackable cross point architecture in which memory cells sit at the intersection of wordlines and bitlines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at jedec.org). Such standards (and similar standards) may be referred to as DDR-based standards and communication interfaces of the storage devices that implement such standards may be referred to as DDR-based interfaces.

Figure 9:
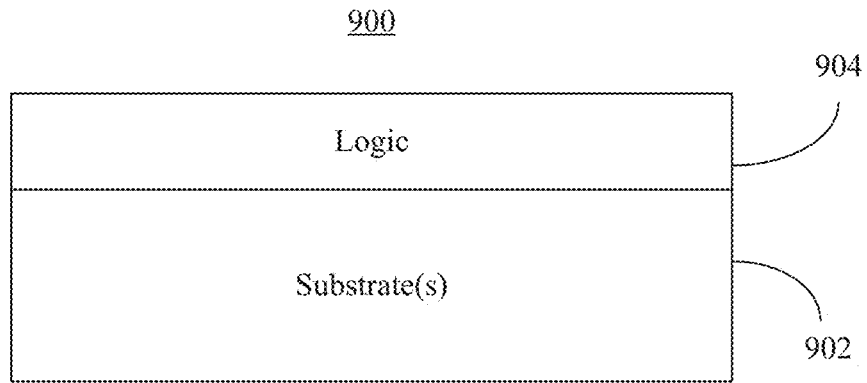
FIG. 9 is an illustration of an example of a semiconductor package apparatus according to an embodiment.

FIG. 9 shows a semiconductor apparatus 900 (e.g., chip, die) that includes one or more substrates 902 (e.g., silicon, sapphire, gallium arsenide) and logic 904 (e.g., a memory controller including transistor array and other integrated circuit/IC components) coupled to the substrate(s) 902. The logic 904, which may be implemented at least partly in configurable logic and/or fixed-functionality hardware logic, may generally implement one or more aspects of the method 300 (FIG. 3), the method 400 (FIG. 4A), the method 500 (FIG. 5A), the method 600 (FIG. 6A), and the method 700 (FIG. 7).

Thus, the logic 904 may communicate with a local system memory and with a memory controller to optimize the available memory in a power conscious compute platform. For example, a memory controller includes logic to communicate with a system memory to divide a plurality of memory channels into functional channels and performance channels. The functional channels are in an active power state during a boot process and the performance channels are in an idle power state during the boot process. The memory controller includes logic to track memory usage and bring the performance channels out of the idle power state and into the active power state in response to the tracked memory usage.

The illustrated apparatus 900 may be considered to be performance-enhanced to the extent that it may advantageously provide power savings. For example, typical systems—even the high-end systems—are often used for browsing and communication. These browsing and communication applications use relatively low memory bandwidth in the range of 10-30 GB/s. This bandwidth can easily be supplied by a 128-bit memory channel. Also, with increasing DRAM bit density the memory capacity for one channel is sufficient for running these workloads. In a system with a 256-bit memory channel, turning off 128-bits will reduce the power in the memory controller, physical layer (PHY), and DRAMs, etc. Additionally, or alternatively, implementations described herein advantageously provide scalability. For example, some implementations are extended to include tiered memory including CXL.mem (e.g., COMPUTE EXPRESS LINK (CXL)) or similar based memory channels.

In one example, the logic 904 includes transistor channel regions that are positioned (e.g., embedded) within the substrate(s) 902. Thus, the interface between the logic 904 and the substrate(s) 902 may not be an abrupt junction. The logic 904 may also be considered to include an epitaxial layer that is grown on an initial wafer of the substrate(s) 902.

ADDITIONAL NOTES AND EXAMPLES

Example 1: A semiconductor apparatus comprising: one or more substrates; and a logic coupled to the one or more substrates, where the logic is implemented at least partly in one or more of configurable or fixed-functionality hardware logic, the logic to: track memory usage, wherein one or more functional channels of a plurality of memory channels are in an active power state during a boot process and one or more performance channels of the plurality of memory channels are in an idle power state during the boot process; and bring the one or more performance channels out of the idle power state and into the active power state in response to the tracked memory usage.

Example 2: The semiconductor apparatus of Example 1, wherein the logic is further to: divide the plurality of memory channels into the one or more functional channels and the one or more performance channels; and train the plurality of memory channels to function as either the one or more functional channels or as the one or more performance channels in response to powering on.

Example 3: The semiconductor apparatus of Examples 1 to 2, further comprising: wherein the one or more performance channels are not available to an operating system and do not retain data when in the idle power state, and wherein the one or more performance channels are available to the operating system and retain data when in the active power state.

Example 4: The semiconductor apparatus of Examples 1 to 3, wherein the logic is further to: predict future memory demand based on the tracked memory usage; and bring the one or more performance channels out of the idle power state and into the active power state in response to the predicted future memory demand.

Example 5: The semiconductor apparatus of Examples 1 to 4, wherein the logic is further to: bring the one or more performance channels back out of the active power state and back into the idle power state in response to the tracked memory usage.

Example 6: The semiconductor apparatus of Examples 1 to 5, wherein the logic is further to: predict future memory demand based on the tracked memory usage; and bring the one or more performance channels back out of the active power state and back into the idle power state in response to the predicted future memory demand.

Example 7: The semiconductor apparatus of Examples 1 to 6, wherein the logic is further to: move data from the one or more performance channels either to storage or to the one or more functional channels prior to bringing the one or more performance channels back out of the active power state and back into the idle power state; and remove availability of the operating system to the one or more performance channels prior to bringing the one or more performance channels back out of the active power state and back into the idle power state.

Example 8: The semiconductor apparatus of Examples 1 to 7, wherein the semiconductor apparatus manages a system memory communicatively coupled to a processor.

Example 9: At least one computer readable storage medium comprising a set of executable program instructions, which when executed by a computing system, cause the computing system to: track memory usage, wherein one or more functional channels of a plurality of memory channels are in an active power state during a boot process and one or more performance channels of the plurality of memory channels are in an idle power state during the boot process; and bring the one or more performance channels out of the idle power state and into the active power state in response to the tracked memory usage.

Example 10: The at least one computer readable storage medium of Example 9, wherein the instructions, when executed, further cause the computing system to: divide the plurality of memory channels into the one or more functional channels and the one or more performance channels; and train the plurality of memory channels to function as either the one or more functional channels or as the one or more performance channels in response to powering on.

Example 11: The at least one computer readable storage medium of Examples 9 to 10, further comprising: wherein the one or more performance channels are not available to an operating system and do not retain data when in the idle power state, and wherein the one or more performance channels are available to the operating system and retain data when in the active power state.

Example 12: The at least one computer readable storage medium of Examples 9 to 11, wherein the instructions, when executed, further cause the computing system to: bring the one or more performance channels back out of the active power state and back into the idle power state in response to the tracked memory usage.

Example 13: The at least one computer readable storage medium of Example 12, wherein the instructions, when executed, further cause the computing system to: move data from the one or more performance channels either to storage or to the one or more functional channels prior to bringing the one or more performance channels back out of the active power state and back into the idle power state; and remove availability of an operating system to the one or more performance channels prior to bringing the one or more performance channels back out of the active power state and back into the idle power state.

Example 14: The at least one computer readable storage medium of Examples 9 to 12, wherein the instructions, when executed, further cause the computing system to: predict future memory demand based on the tracked memory usage; bring the one or more performance channels out of the idle power state and into the active power state in response to the predicted future memory demand; and bring the one or more performance channels back out of the active power state and back into the idle power state in response to the predicted future memory demand.

Example 15: A method comprising: tracking memory usage, wherein one or more functional channels of a plurality of memory channels are in an active power state during a boot process and one or more performance channels of the plurality of memory channels are in an idle power state during the boot process; and bring the one or more performance channels out of the idle power state and into the active power state in response to the tracked memory usage.

Example 16: The method of Example 15, further comprising: dividing the plurality of memory channels into the one or more functional channels and the one or more performance channels; and training the plurality of memory channels to function as either the one or more functional channels or as the one or more performance channels in response to powering on.

Example 17: The method Examples 15 to 16, further comprising: wherein the one or more performance channels are not available to an operating system and do not retain data when in the idle power state, and wherein the one or more performance channels are available to the operating system and retain data when in the active power state.

Example 18: The method of Examples 15 to 17, further comprising: bringing the one or more performance channels back out of the active power state and back into the idle power state in response to the tracked memory usage.

Example 19: The method of Example 18, further comprising: moving data from the one or more performance channels either to storage or to the one or more functional channels prior to bringing the one or more performance channels back out of the active power state and back into the idle power state; and removing availability of an operating system to the one or more performance channels prior to bringing the one or more performance channels back out of the active power state and back into the idle power state.

Example 20: The method of Examples 15 to 18, further comprising: predicting future memory demand based on the tracked memory usage; bringing the one or more performance channels out of the idle power state and into the active power state in response to the predicted future memory demand; and bringing the one or more performance channels back out of the active power state and back into the idle power state in response to the predicted future memory demand.

Example 21 includes an apparatus comprising means for performing the method of any one of Examples 1 to 20.

Example 22 includes a machine-readable storage comprising machine-readable instructions which, when executed, implement the method of any one of Examples 16 to 20.

Technology described herein may therefore provide a substantial enhancement to the extent that it may advantageously provide power savings. For example, typical systems—even the high-end systems—are often used for browsing and communication. These browsing and communication applications use relatively low memory bandwidth in the range of 10-30 GB/s. This bandwidth can easily be supplied by a 128-bit memory channel. Also, with increasing DRAM bit density the memory capacity for one channel is sufficient for running these workloads. In a system with a 256-bit memory channel, turning off 128-bits will reduce the power in the memory controller, physical layer (PHY), and DRAMs, etc. Additionally, or alternatively, implementations described herein advantageously provide scalability. For example, some implementations are extended to include tiered memory including CXL.mem (e.g., COMPUTE EXPRESS LINK (CXL)) or similar based memory channels.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus comprising:
a substrate on which to mount memory chips, the memory chips organized as a plurality of memory channels, including a functional channel having a first memory range always available to an operating system (OS) and a performance channel having a second memory range selectively available to the OS based on usage of the memory chips; and
circuitry coupled to the substrate, wherein the circuitry is configured to:
track memory usage for the memory chips, wherein the functional channel is in an active power state during a boot process and the performance channel is in an idle power state during the boot process; and
selectively bring the performance channel out of the idle power state and into the active power state in response to an increase in memory usage and selectively put the performance channel into the idle power state and out of the active power state in response to a decrease in memory usage.

2. The semiconductor apparatus of claim 1, wherein the circuitry is further configured to:
divide the plurality of memory channels into the functional channel and the performance channel; and
train the plurality of memory channels to function as either the functional channel or as the performance channel in response to powering on.

3. The semiconductor apparatus of claim 1,
wherein the performance channel is not available to the OS and does not retain data when in the idle power state, and
wherein the performance channel is available to the OS and retains data when in the active power state.

4. The semiconductor apparatus of claim 1, wherein the circuitry is further configured to:
predict future memory demand based on tracked memory usage; and
selectively bring the performance channel out of the idle power state and into the active power state in response to a predicted future increase in memory demand and selectively put the performance channel into the idle power state and out of the active power state in response to a predicted decrease in memory demand.

5. The semiconductor apparatus of claim 1, wherein the circuitry is further configured to:
move data from the performance channel either to storage or to the functional channel prior to bringing the performance channel out of the active power state and into the idle power state; and
remove availability of the OS to the performance channel prior to bringing the performance channel out of the active power state and into the idle power state.

6. The semiconductor apparatus of claim 1, wherein the semiconductor apparatus manages a system memory communicatively coupled to a processor.

7. A non-transitory computer readable storage medium comprising executable program instructions stored thereon, which when executed by a computing system, cause the computing system to:
track memory usage for memory chips organized as a plurality of memory channels, including a functional channel having a first memory range always available to an operating system (OS) and a performance channel having a second memory range selectively available to the OS based on usage of the memory chips, wherein the functional channel is in an active power state during a boot process and the performance channel is in an idle power state during the boot process; and
selectively bring the performance channel out of the idle power state and into the active power state in response to an increase in memory usage and selectively put the performance channel into the idle power state and out of the active power state in response to a decrease in memory usage.

8. The non-transitory computer readable storage medium of claim 7, wherein the instructions, when executed, further cause the computing system to:

divide the plurality of memory channels into the functional channel and the performance channel; and train the plurality of memory channels to function as either the functional channel or as the performance channel in response to powering on.

9. The non-transitory computer readable storage medium of claim 7,:

wherein the performance channel is not available to the OS and does not retain data when in the idle power state, and wherein the performance channel is available to the OS and retains data when in the active power state.

10. The non-transitory computer readable storage medium of claim 7, wherein the instructions, when executed, further cause the computing system to:

move data from the performance channel either to storage or to the functional channel prior to bringing the performance channel out of the active power state and into the idle power state; and remove availability of the OS to the performance channel prior to bringing the performance channel out of the active power state and into the idle power state.

11. The non-transitory computer readable storage medium of claim 7, wherein the instructions, when executed, further cause the computing system to:

predict future memory demand based on tracked memory usage;

selectively bring the performance channel out of the idle power state and into the active power state in response to a predicted future increase in memory demand; and selectively put the performance channel into the idle power state and out of the active power state in response to a predicted future decrease in memory demand.

12. A method comprising:

tracking memory usage for memory chips organized as a plurality of memory channels, including a functional channel having a first memory range always available to an operating system (OS) and a performance channel having a second memory range selectively available to the OS based on usage of the memory chips, wherein the functional channel is in an active power state during a boot process and the performance channel is in an idle power state during the boot process; and selectively bringing the performance channel out of the idle power state and into the active power state in response to an increase in memory usage and selectively putting the performance channel into the idle power state and out of the active power state in response to a decrease in memory usage.

13. The method of claim 12, further comprising:

dividing the plurality of memory channels into the functional channel and the performance channel; and training the plurality of memory channels to function as either the functional channel or as the performance channel in response to powering on.

14. The method of claim 12, wherein the performance channel is not available to the OS and does not retain data when in the idle power state, and wherein the performance channel is available to the OS and retains data when in the active power state.

15. The method of claim 12, further comprising:

moving data from the performance channel either to storage or to the functional channel prior to bringing the performance channel out of the active power state and into the idle power state; and removing availability of the OS to the performance channel prior to bringing the performance channel out of the active power state and into the idle power state.

16. The method of claim 12, further comprising:

predicting future memory demand based on tracked memory usage;

selectively bringing the performance channel out of the idle power state and into the active power state in response to a predicted future increase in memory demand; and selectively putting the performance channel into the idle power state and out of the active power state in response to a predicted future decrease in memory demand.

* * * * *